(12) United States Patent
Wimmer

(10) Patent No.: US 10,096,986 B2
(45) Date of Patent: Oct. 9, 2018

(54) DEVICE FOR SEALING AN ELECTRICAL CONNECTION

(71) Applicant: Lisa Draexlmaier GmbH, Vilsbiburg (DE)

(72) Inventor: Wolfgang Wimmer, Salching (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 1 day.

(21) Appl. No.: 15/352,114

(22) Filed: Nov. 15, 2016

(65) Prior Publication Data

US 2017/0141557 A1 May 18, 2017

(30) Foreign Application Priority Data

Nov. 16, 2015 (DE) .................. 10 2015 222 582

(51) Int. Cl.
| | |
|---|---|
| *H02G 15/04* | (2006.01) |
| *H01B 1/02* | (2006.01) |
| *H01B 3/44* | (2006.01) |
| *H01B 3/46* | (2006.01) |
| *H01R 4/70* | (2006.01) |

(Continued)

(52) U.S. Cl.
CPC .............. *H02G 15/04* (2013.01); *H01B 1/02* (2013.01); *H01B 3/441* (2013.01); *H01B 3/443* (2013.01); *H01B 3/46* (2013.01); *H01R 4/70* (2013.01); *H01R 13/5205* (2013.01); *H01R 13/5216* (2013.01); *H02G 15/013* (2013.01)

(58) Field of Classification Search
USPC ........ 174/74 R, 75 C, 78, 88 C; 439/98, 497
See application file for complete search history.

(56) References Cited

U.S. PATENT DOCUMENTS

| | | | | |
|---|---|---|---|---|
| 5,234,515 | A | | 8/1993 | Sekkelsten |
| 5,245,133 | A | * | 9/1993 | DeCarlo ............. H02G 15/113 174/76 |
| 5,821,461 | A | * | 10/1998 | Sackett .................. H01R 4/70 174/75 B |

(Continued)

FOREIGN PATENT DOCUMENTS

| | | |
|---|---|---|
| DE | 692 14 315 T2 | 4/1997 |
| DE | 696 10 400 T2 | 5/2001 |

(Continued)

OTHER PUBLICATIONS

Office Action in German Application No. DE 10 2015 222 582.8, dated Apr. 11, 2016.

*Primary Examiner* — William H Mayo, III
(74) *Attorney, Agent, or Firm* — Finnegan, Henderson, Farabow, Garrett & Dunner LLP

(57) ABSTRACT

A sealing device to seal a connection between an electrical conductor with a PVC or silicone insulation, leaving one end of the conductor exposed, and a contact element electrically connected to the conductor. The contact element is covered with a jacket of a semi-crystalline thermoplastic material, and is exposed in the area of bonding with the conductor. A sleeve-shaped adapter of a semi-crystalline thermoplastic material is inserted and surrounds the conductor with a gasket at an end area of the PVC or silicon insulation. The device also includes an overmold of a thermoplastic or terpolymer elastomer that covers the exposed end of the conductor, the exposed portion of the contact element and at least portions of the adapter and of the jacket of the contact element.

20 Claims, 4 Drawing Sheets

(51) Int. Cl.
 *H01R 13/52* (2006.01)
 *H02G 15/013* (2006.01)

(56) References Cited

U.S. PATENT DOCUMENTS

| | | | | |
|---|---|---|---|---|
| 6,380,485 | B1* | 4/2002 | Beaman | H01R 9/035 |
| | | | | 174/88 R |
| 6,428,344 | B1* | 8/2002 | Reed | H01R 9/05 |
| | | | | 439/455 |
| 7,906,730 | B2* | 3/2011 | Atkinson | H01R 13/6592 |
| | | | | 174/78 |
| 8,602,820 | B2* | 12/2013 | Cortes Roque | B29C 45/14311 |
| | | | | 439/604 |
| 2009/0173518 | A1* | 7/2009 | Flagler | A61B 5/0002 |
| | | | | 174/135 |
| 2010/0307815 | A1* | 12/2010 | Gehrke | H01B 7/2825 |
| | | | | 174/520 |
| 2012/0198933 | A1* | 8/2012 | Steinbrink | G01D 11/245 |
| | | | | 73/494 |
| 2013/0129289 | A1* | 5/2013 | Roland | H02G 15/046 |
| | | | | 385/102 |
| 2014/0174822 | A1* | 6/2014 | Corona | H01R 4/02 |
| | | | | 174/77 R |
| 2014/0273619 | A1* | 9/2014 | Showcatally | H01R 13/60 |
| | | | | 439/550 |
| 2015/0325340 | A1 | 11/2015 | Specht et al. | |

FOREIGN PATENT DOCUMENTS

| | | |
|---|---|---|
| DE | 10 2012 214 161 A1 | 2/2014 |
| DE | 10 2012 217 618 A1 | 3/2014 |
| DE | 10 2014 004 432 A1 | 10/2014 |
| DE | 10 2014 004 433 A1 | 10/2014 |
| DE | 10 2014 004 430 A1 | 10/2015 |
| DE | 10 2014 004 431 A1 | 10/2015 |
| EP | 0 780 949 B1 | 9/2000 |

\* cited by examiner

DEVICE FOR SEALING AN ELECTRICAL CONNECTION

CROSS REFERENCE TO RELATED APPLICATIONS

This application is based upon and claims the benefit of prior German Patent Application No. 10 2015 222 582.8, filed on Nov. 16, 2015, the entire contents of which are incorporated herein by reference.

TECHNICAL FIELD

The present disclosure relates to a device for sealing an electrical connection between an electrical conductor and a contact element with dissimilar insulating materials that do not permit uniform overmolding in order to seal the connection. Connections of this kind can be used in on-board electrical applications in automotive engineering.

BACKGROUND

German Patent Application Nos. DE 102012214161 A1, DE 102014004432 A1 and DE 102014004433 A1 disclose connecting electrical conductors and contact elements, for instance when the contact elements are paired with flat conductors. For an effective electrical connection the insulation is generally removed from both the conductor and the contact element to permit them to be interconnected, for instance by welding.

German Patent Application Nos. DE 102014004431 A1 and DE 102014004430 A1 give extrusion with a self-adhesive polypropylene as a possible solution for sealing the exposed transitional areas between conductor and contact element. In these cases, however, the different flat conductors and contact elements are provided with a uniform insulating material for which a compatible material can be selected for the extrusion.

German Patent Application No. DE 102012217618 A1 discloses another alternative by casting around a flat conductor.

When two dissimilar insulating materials are used, as for example in an aluminum busbar with polypropylene (PP) insulation and a round aluminum or copper conductor with polyvinyl chloride (PVC) or silicone insulation, it is currently not possible to encapsulate the connection, since no material for encapsulating and bonding to the insulation is known that is suitable for both PP and PVC.

Attempts to encapsulate a silicone-insulated cable to prevent the intrusion of water or other media have shown that the resulting jacket is not durably tight.

U.S. Pat. No. 5,821,461 A describes a sealing device for a splice between a PU-insulated cable and a neoprene-insulated cable, in which a neoprene packing gland is formed on the neoprene insulation and then a large-area urethane sheath is molded over the gland and the splice.

German Patent Application No. DE 10 2014 004 430 A1 discloses self-adhesive synthetic materials to encapsulate flat conductors.

German Patent Application No. DE 692 14 315 T2 discloses using an insulating bushing to seal a cable connector for underwater cables. The cable to be connected here has PE and/or rubber insulation.

German Patent Application No. DE 696 10 400 T2 discloses a cable adapter having an elastic sleeve and with suitable material selected.

SUMMARY

Embodiments of the present disclosure provide a device for sealing a connection between an electrical conductor and a contact element insulated with dissimilar materials, in the simplest possible constructive manner.

Embodiments of the present disclosure provide a sealing device suitable for a connection between an electrical conductor insulated with PVC or silicone, leaving one end of the conductor exposed, and a contact element electrically connected to the conductor. The contact element, which can be a flat conductor, is enclosed in a jacket made of a semi-crystalline thermoplastic material. The contact element is exposed in the area of bonding with the conductor. According to the present disclosure, a sleeve-shaped adapter of a semi-crystalline thermoplastic material is inserted, surrounding the conductor with a gasket in an end area of the PVC or silicone insulation. Since the adapter is in the shape of a sleeve it can be pushed integrally over the electrical conductor. If the conductor is circular, the adapter is cylindrical; if the conductor is flatter, the shape of the sleeve deviates from rotational symmetry accordingly. The adapter may also be made of metal, thereby causing the overmold material to "set" more quickly during the overmolding process.

Embodiments of the present disclosure provide a device for sealing an electrical connection between an electrical conductor having PVC or silicone insulation with an exposed end not covered by the insulation, and a contact element electrically connected to the electrical conductor, the contact element being covered by a jacket of semi-crystalline thermoplastic material except in an exposed bonding area, the device comprising a sleeve-shaped adapter made of semi-crystalline thermoplastic material, the sleeve-shaped adapter comprising a gasket surrounding the electrical conductor in an end area of the insulation; and an overmold made of a thermoplastic or terpolymer elastomer, the overmold covering the exposed end of the electrical conductor, the exposed area of the contact element, at least portions of the adapter, and at least portions of the jacket of the contact element.

According to embodiments of the present disclosure, the device also includes an overmold of a thermoplastic or terpolymer elastomer that covers the exposed end of the conductor, the exposed portion of the contact element and at least portions of the adapter and of the jacket of the contact element.

According to embodiments of the present disclosure, a thermoplastic elastomer is proposed wherein selecting the appropriate adapter material and providing its own seal eliminates the material limitations, making it possible to select a material for the overmolding process that adheres uniformly to both ends (contact element and adapter).

A thermoplastic elastomer (TPE) bonds well with the insulation of the contact element. TPEs are synthetic materials that behave similarly to classic elastomers at room temperature, but can be plastically deformed when heat is applied, thereby demonstrating a thermoplastic behavior that renders it suitable for injection molding. Polyethylene (PE) is a TPE. TPE also bonds well with an appropriate material selected for the adapter, so that inexpensive PVC cables, i.e. a cable with PVC insulation, can be used for the conductor. Terpolymer elastomers such as ethylene propylene diene monomer (EPDM), also referred to as rubber, have similarly favorable properties in terms of bonding and behavior in injection molding.

A thermoplastic or terpolymer elastomer also bonds well to a semi-crystalline thermoplastic material, particularly polypropylene (PP), or to metal, so that a media-tight seal is created at both ends by the overmolding. According to embodiments of the present disclosure, the problems associated with overmolding in silicone cables may also be overcome and a tight seal may be achieved with this system. Media that may intrude at the adapter end that is not overmolded are captured by the seal inside the adapter, resulting in a particularly robust solution for automotive engineering applications.

According to embodiments of the present disclosure, the gasket also seals the electrical connection on the side of the insulation adjacent the electrical conductor.

According to embodiments of the present disclosure, the adapter is a two-component injection-molded part with a gasket, i.e. the gasket is produced from a second material during the injection molding process of the adapter. In this embodiment, injection molding as a two-component part may be more complex but requires no assembly effort to manufacture the adapter.

According to embodiments of the present disclosure, the adapter is a single-component injection-molded part with a gasket that is subsequently inserted into the adapter and secured on the adapter with a cap. This embodiment may be less expensive but requires slightly more assembly effort.

According to embodiments of the present disclosure, the seal is improved in that the gasket is arranged on the adapter end facing the insulation of the conductor and a sealing tip with an undercut is provided at the adapter end facing the exposed end of the conductor. Here the end segment of the sealing tip hugs the PVC or silicone insulation. A tip forming the undercut engages at the area of transition from crimps or other conductive materials of the electrical conductor to the insulation or it is compressed into the insulation.

According to embodiments of the present disclosure, the gasket consists of a thermoplastic elastomer or silicone, whereby it can closely hug the insulation of the electrical conductor. If the gasket additionally contains a sealing ring with a plurality of sealing lips, the seal can be further improved by a succession of several sealing zones.

The electrical bonding of busbars is particularly demanding as they are frequently made of aluminum to reduce weight. The sealing according to embodiments of the present disclosure can be applied here, particularly if the busbar functions as a contact element along the lines of the present disclosure.

According to embodiments of the present disclosure, the busbar can be connected to the contact element via a contact plate, particularly a tiered contact plate, to further improve the electrical connection between the electrical conductor and the contact element. Broader contact zones can be created in this way for an improved mechanical and electrical bond. The tier of the contact plate is adapted to fit the shape of the contact element (where the tier height corresponds to the thickness of the contact element). If the electrical conductor is a round conductor made of aluminum, for example, it is flattened in the area of the bonding with the contact plate.

The described properties of the present disclosure and the manner in which these are achieved will be described in more detail based on the following detailed description. The foregoing general description and the following detailed description are exemplary and explanatory only, and are not restrictive of embodiments consistent with the present disclosure. Further, the accompanying drawings illustrate embodiments of the present disclosure, and together with the description, serve to explain principles of the present disclosure.

DETAILED DESCRIPTION

If an electrical conductor 1 with a PVC or silicone insulation 2 to which conventional injection molding materials bond poorly is to be connected to a contact element 3 enclosed in a jacket 4 of insulation, problems may arise concerning not only the electrical bonding, but also the sealing of the connector plug.

Figure 1:
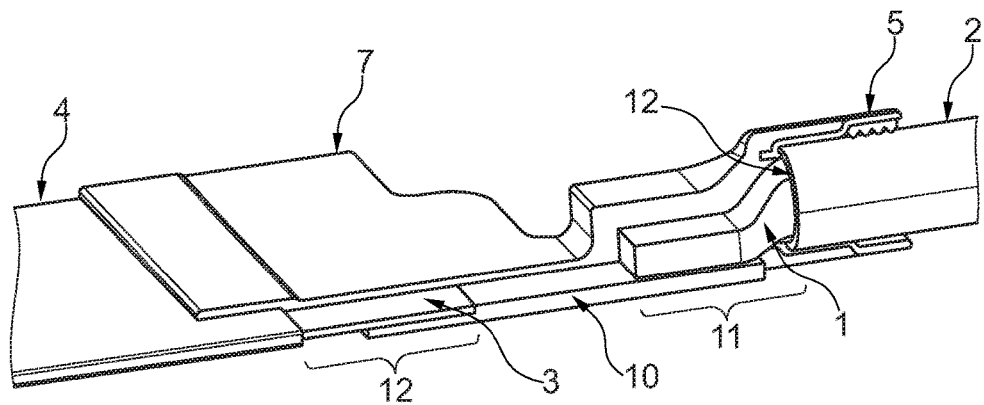
FIG. 1 shows a sectional view of a device for sealing a connection, with cut-out overmolding.

In the exemplary device according to FIG. 1, the contact element 3 is depicted as a single-layer flat conductor. However, multi-layer flat conductors, busbars or other forms of electrical contacts can be alternatively used. For example, the flat conductor may measure 60 mm wide×1 mm thick; as an alternative flat conductors measuring 20×3 or 20×2 may also be used. The flat conductor 3 is enclosed in a jacket that is thicker on the narrow sides than on the broad sides, for example, 0.5 mm for the broad side and 1 mm for the narrow side.

A contact plate 10 is inserted between the flat conductor 3 and the electrical conductor 1. This contact plate 10 is tiered, i.e. it has an area of reduced thickness corresponding to the thickness of the flat conductor 3, thereby creating a large-surface support for the flat conductor 3 and enabling both parts to be securely interconnected by, for example, an electrical bonding process such as ultrasonic welding. The same arrangement may be used for the connection between the electrical conductor 1 and the contact plate 10. Here the electrical conductor 1 is flattened at an exposed end 11 in such a way that a large-surface support is formed on the contact plate 10. It is also possible to use an electrical connecting method such as ultrasonic welding.

To facilitate subsequent overmolding of the junction between the conductor 1 and the contact element 3, an adapter 5 made of polypropylene (PP) is slid over the electrical conductor 1 and its PVC or silicone insulation 2 and attached in an end portion 12 of the PVC or silicone insulation. Applying an overmold 7 to the junction, typically by an injection-molding process, yields a seal not only of the exposed ends 11 of the conductor 1, the contact plate 10 and an exposed portion 13 of the contact element 3, but also of portions of the adapter 5 and the jacket 4 of the flat conductor 3.

The overmold 7 consists of polyethylene (PE), a thermoplastic elastomer, to ensure that it forms a secure bond. Since the jacket 4 of the flat conductor 3 is made of a semi-crystalline thermoplastic, in this case polypropylene (PP), as is the adapter 5, the result is good adherence to both plastics and thus good sealing action against the intrusion of media to the electrical contact points.

Figure 2:
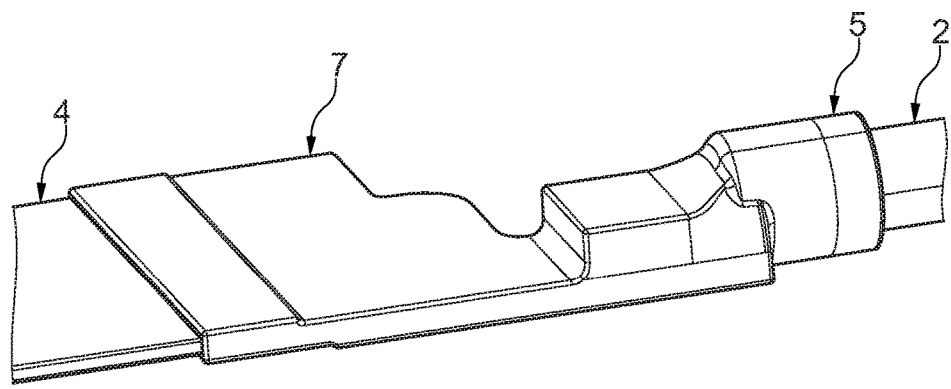
FIG. 2 shows the sealing device according to FIG. 1 after the overmolding.

FIG. 2 shows the result of the overmolding. This illustrates that the overmolding 7 encapsulates all electrically conductive surfaces as well as portions of the jacket 4 of the contact element 3 and the adapter 5. Thus, a robust and reliable sealing of the connection between the given conductors is provided.

Figure 3:
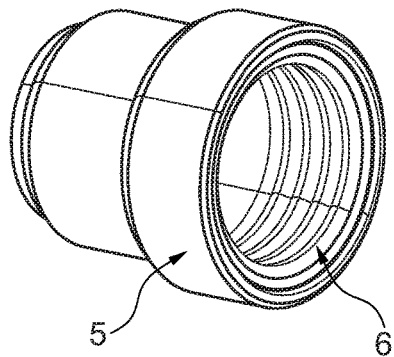
FIGS. 3 and 4 show a first embodiment of the adapter.
Figure 4:
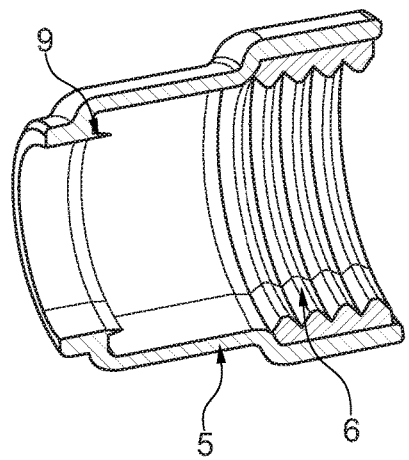

If the adapter 5 is embodied as an integral two-component injection-molded part, as indicated in FIGS. 3 and 4, then its jacket is made of polypropylene (PP). However, the inside gasket 6 serving as the second component can consist of a different material, such as a thermoplastic elastomer or silicone. The adapter is slid onto the exposed end of the electrical conductor before being flattened and electrically connected to the contact plate, until the tapering side of the adapter 5 (on the left in FIGS. 3 and 4) abuts the PVC or silicone insulation of the conductor.

Figure 5:
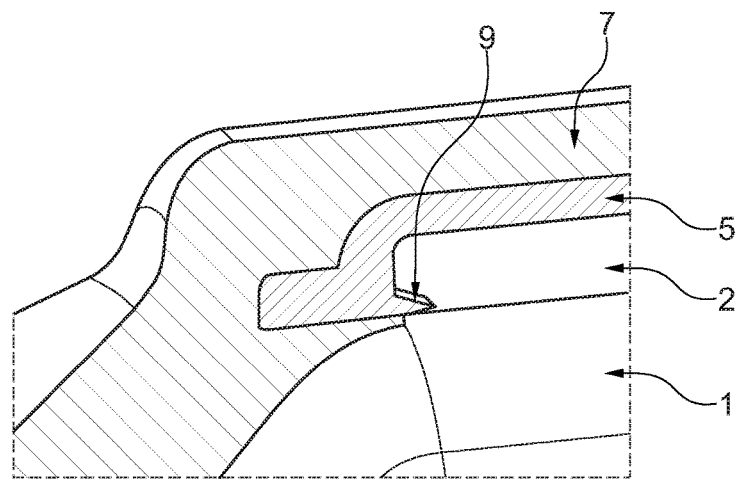
FIG. 5 shows a sectional view of the connection, taken through the electrical conductor, the adapter, and the overmolding.

As shown in FIG. 5, upon the abutment a sealing tip 9 of the adapter 5 directly engages a transitional area between the electrical conductor 1 and its insulation 2 and improves the seal against any media that may seep in along the insulation 2 and into the adapter 5. As shown below, the pressure of the overmolding 7 during the overmolding of the connection ensures that the adapter 5 and thus the sealing tip 9 is firmly pressed against the insulation 2 and remains in place.

Figure 6:
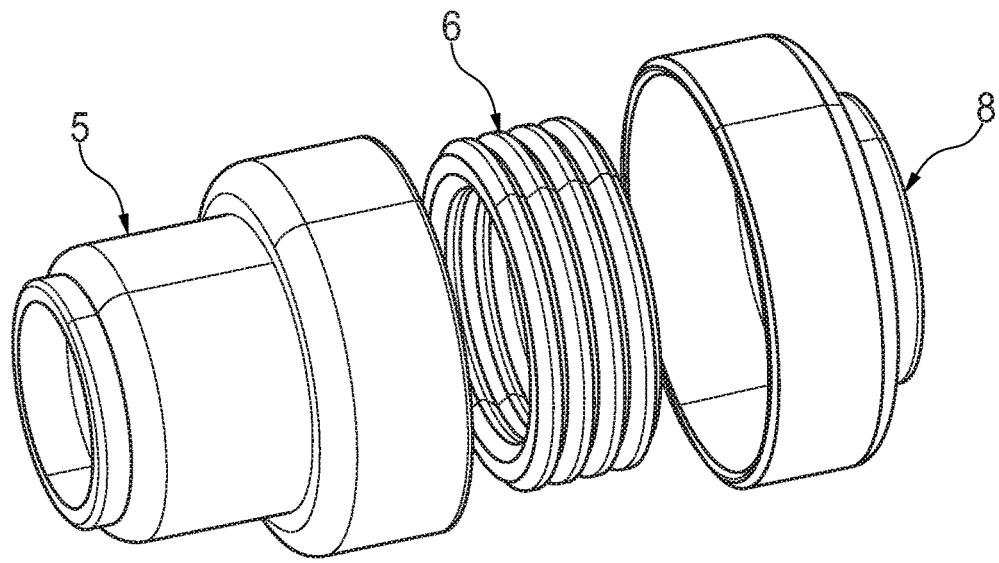
FIGS. 6 and 7 show a second embodiment of the adapter with a cap in place.
Figure 7:
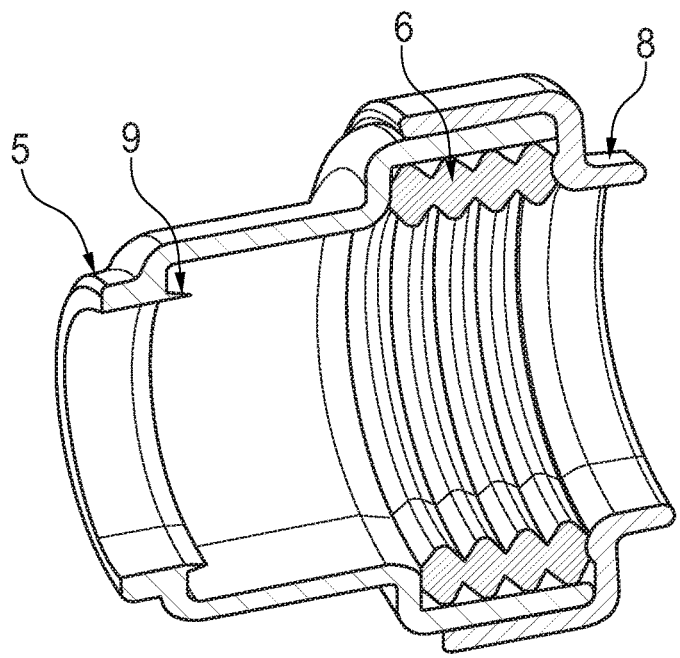

An alternative adapter 5 is shown in FIGS. 6 and 7. The adapter 5 itself consists of polypropylene (PP), but in contrast to the embodiment according to FIGS. 3 and 4, it was produced as a single-component injection-molded part. To improve the seal here, a separate gasket 6 is subsequently placed in the adapter and is secured by a cap 8. The cap 8 is clipped to the adapter 5. When the adapter 5 is mounted in this way it can be slid onto the electrical conductor in a manner similar to that of the adapter 5 in FIGS. 3 and 4. The cap 8 prevents the gasket 6 from dislodging from the adapter 5 during or after the overmolding process.

The gasket in both embodiments of the adapter 5 is made of a thermoplastic elastomer or silicone and comprises a sealing ring with several sealing lips, for example four sealing lips, that are directed inwardly toward the insulation 2 of the conductor 1. These soft sealing lips adapt to the insulation 2 of the electrical conductor 1, thus creating several sealing zones that very firmly prevent the intrusion of media such as water.

Figures 8, 9:
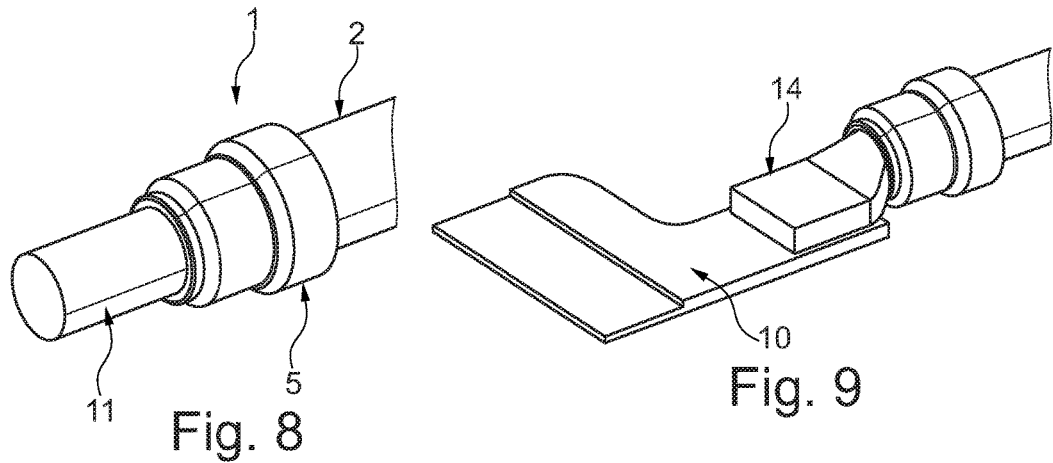
FIGS. 8 to 11 show the workflow of the production of a sealing device according to the present disclosure.

According to FIG. 8 the first work step is to slide an adapter 5 onto an exposed end 11 of the electrical conductor 1. The insulation 2 is stripped from this exposed end 11. As shown above, the sealing tip, which is not visible in FIG. 8, is seated on the transition between the insulation 2 and the electrical conductor 1.

Subsequently, according to FIG. 9, the exposed end 11 of the conductor 1 is placed onto a contact plate 10. The exposed end 11 is flattened and electrically conductively connected to the contact plate 10 at a weld 14. This is accomplished with an ultrasonic welding process.

Figure 10:
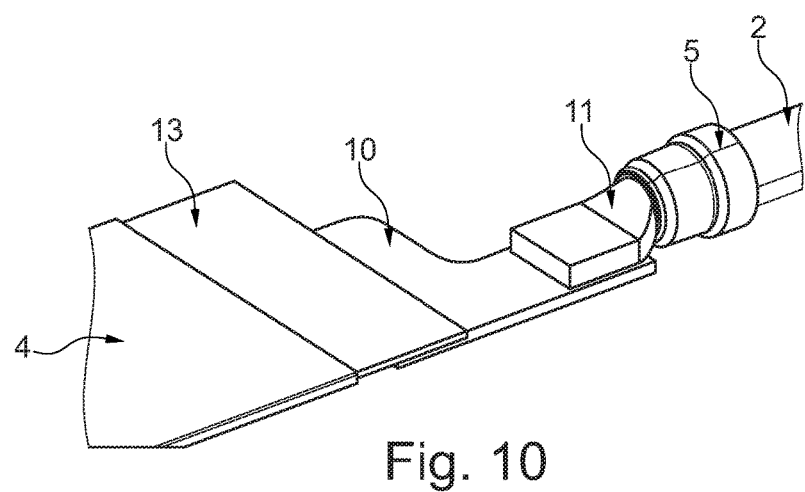

In the next step, corresponding to FIG. 10, a flat conductor 3 is placed with its exposed area 13, which is not enclosed by a jacket 4, onto the contact plate 10. As explained above, the contact plate 10 is tiered to precisely fit a thickness of the flat conductor 3. The transition described here between the flat conductor 3 and the contact plate 10 is also securely electrically connected by ultrasonic welding.

Figure 11:
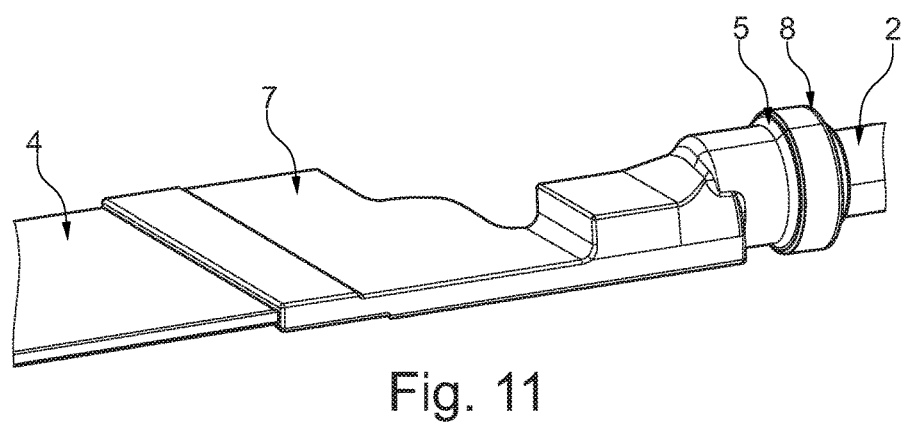

Now, in a concluding step, the junction is sealed by overmolding 7. This step is accomplished with an injection-molding tool into which the previously produced connection is placed. The resulting cavity between the connection and the walls of the injection-molding tool is dimensioned to permit only as much material as is necessary to produce the overmolding 7 to be applied onto the surfaces provided for this purpose. The surfaces provided are the exposed conductor portions, i.e. the exposed end 11 of the electrical conductor 1, the contact plate 10 and the exposed area 13 of the flat conductor 3. However, the overmolding 7 also covers additional portions of the jacket 4 of the flat conductor 3 and portions of the adapter 5, but according to FIG. 11 only up to the cap 8 of the adapter 5 or alternatively up to the limiting bead in an adapter according to FIGS. 3 and 4. In FIG. 11, in a departure from FIGS. 8 to 10, the second adapter embodiment is shown with a cap 8 to demonstrate that the overmolding 7 should not reach as far as cap 8 in order to prevent damage to the inside gasket by the influx of heat. In both variants of the adapter, the overmolding 7 should only enclose that portion of the adapter that does not contain the gasket.

The sealing is enhanced during the injection molding of the overmolding 7 in that the injection pressure of the material of the overmolding 7 presses the adapter 5 firmly against the insulation 2 of the electrical conductor 1. That is the first step of the sealing. Thus, no material from the overmolding 7 will flow into the adapter during the overmolding process.

In a second sealing step, the previously fluid material of the seal 7 quickly sets up, since the electrical surfaces, in this case aluminum, provide excellent heat dissipation and the overmolding 7 can quickly cool off this way. Thus the heretofore fluid material instantaneously sets up and forms a secure seal before this material can possibly be pressed through the gasket.

The drawings depict merely schematic representations and serve only to explain the present disclosure. The same or similar elements are provided throughout with the same reference numbers. While the present disclosure is illustrated and described in detail according to the above embodiments, the present disclosure is not limited to these embodiments and additional embodiments may be implemented. Further, other embodiments and various modifications will be apparent to those skilled in the art from consideration of the specification and practice of one or more embodiments disclosed herein, without departing from the scope of the present disclosure.

LIST OF REFERENCE NUMERALS electrical conductor 1
PVC or silicone insulation 2
contact element 3
jacket 4
adapter 5
gasket 6
overmolding 7
cap 8
sealing tip 9
contact plate 10
exposed end of the conductor 11
end area of the PVC or silicone insulation 12
exposed area of the contact element 13
weld 14

What is claimed is:

1. A device for sealing an electrical connection between an electrical conductor having PVC or silicone insulation with an exposed end not covered by the insulation, and a contact element electrically connected to the electrical conductor, the contact element being covered by a jacket of semi-crystalline thermoplastic material except in an exposed bonding area, the device comprising:
- a sleeve-shaped adapter made of semi-crystalline thermoplastic material, the sleeve-shaped adapter comprising a gasket surrounding the electrical conductor in an end area of the insulation; and
- an overmold made of a thermoplastic or terpolymer elastomer, the overmold directly covering the exposed end of the electrical conductor, the exposed area of the contact element, at least a portion of the adapter, and at least a portion of the jacket of the contact element.

2. The device according to claim 1, wherein the adapter is one of:
- a two-component injection-molded part with the gasket; or
- a single-component injection-molded part having the gasket secured to the adapter by a cap.

3. The device according to claim 2, wherein:
- the gasket is arranged on an end of the adapter directed towards the insulation of the electrical conductor and
- the gasket further comprises a sealing tip having an undercut, the sealing tip being situated on an end of the adapter directed toward the exposed end of the electrical conductor and configured to fit the insulation in the end area of the insulation.

4. The device according to claim 2, wherein the gasket comprises at least one of a thermoplastic elastomer or silicone.

5. The device according to claim 4, wherein the thermoplastic elastomer is a polyethylene.

6. The device according to claim 2, wherein the gasket comprises a sealing ring having a plurality of sealing lips.

7. The device according to claim 1, wherein the semi-crystalline thermoplastic material is a polypropylene.

8. The device according to claim 1, wherein the contact element is one of a busbar or a flat conductor made of aluminum.

9. The device according to claim 8, wherein the contact element is connected to the electrical conductor across a contact plate.

10. The device according to claim 8, wherein the contact plate is a tiered contact plate.

11. The device according to claim 1, wherein the electrical conductor is a round conductor made of aluminum.

12. A device for sealing an electrical connection between an electrical conductor and a contact element electrically connected to the electrical conductor, the electrical conductor comprising insulation and the contact element being covered by a jacket, the device comprising:
- a sleeve-shaped adapter comprising a semi-crystalline thermoplastic material, the sleeve-shaped adapter further comprising a gasket surrounding the electrical conductor in a first end area of the insulation; and
- an overmold comprising at least one of a thermoplastic or terpolymer elastomer, the overmold directly covering:
  - an exposed end of the electrical conductor not covered by the insulation;
  - an exposed bonding area of the contact element not covered by the jacket,
  - at least a portion of the adapter, and
  - at least a portion of the jacket of the contact element.

13. The device according to claim 12, wherein the adapter is one of:
- a two-component injection-molded part with the gasket, or
- a single-component injection-molded part having the gasket secured to the adapter by a cap.

14. The device according to claim 13, wherein the gasket is arranged on an end of the adapter directed towards the insulation of the electrical conductor, the gasket further comprising:
- a sealing tip having an undercut, the sealing tip being situated on an end of the adapter directed toward the exposed end of the electrical conductor and configured to fit the insulation in the first end area of the insulation.

15. The device according to claim 13, wherein the gasket comprises at least one of a thermoplastic elastomer or silicone.

16. The device according to claim 13, wherein the gasket comprises a sealing ring having a plurality of sealing lips.

17. The device according to claim 12, wherein the contact element is one of a busbar or a flat conductor made of aluminum.

18. The device according to claim 12, wherein the contact element is connected to the electrical conductor across a contact plate.

19. The device according to claim 18, wherein the contact plate is a tiered contact plate.

20. The device according to claim 12, wherein the electrical conductor is a round conductor made of aluminum.

* * * * *